United States Patent
Hayashi et al.

(10) Patent No.: US 12,423,868 B2
(45) Date of Patent: Sep. 23, 2025

(54) CONTROL SYSTEM AND CONTROL METHOD

(71) Applicant: JVCKENWOOD Corporation, Yokohama (JP)

(72) Inventors: Keita Hayashi, Yokohama (JP); Hirofumi Yamamoto, Yokohama (JP); Tadashi Ishiwata, Yokohama (JP); Keiji Tsuchiya, Yokohama (JP); Yasufumi Nakaaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/664,136

(22) Filed: May 14, 2024

(65) Prior Publication Data

US 2024/0303864 A1    Sep. 12, 2024

Related U.S. Application Data

(63) Continuation of application No. PCT/JP2022/033199, filed on Sep. 2, 2022.

(30) Foreign Application Priority Data

Nov. 18, 2021 (JP) .................................. 2021-187860

(51) Int. Cl.
*G06T 7/80* (2017.01)
*G06V 10/75* (2022.01)
*H04N 23/23* (2023.01)

(52) U.S. Cl.
CPC .............. *G06T 7/80* (2017.01); *G06V 10/758* (2022.01); *H04N 23/23* (2023.01)

(58) Field of Classification Search
CPC ......... G06T 7/80; G06V 10/758; H04N 23/23
See application file for complete search history.

(56) References Cited

U.S. PATENT DOCUMENTS

| | | | |
|---|---|---|---|
| 2013/0002874 A1* | 1/2013 | Negoro .................. | H04N 23/20 348/148 |
| 2019/0221004 A1* | 7/2019 | Tokita ....................... | B60R 1/30 |

FOREIGN PATENT DOCUMENTS

| | | |
|---|---|---|
| JP | 2007174113 A | 7/2007 |
| JP | 2007201807 A | 8/2007 |
| JP | 2007336288 A | 12/2007 |

\* cited by examiner

*Primary Examiner* — Yassin Alata
(74) *Attorney, Agent, or Firm* — Procopio, Cory, Hargreaves & Savitch LLP

(57) ABSTRACT

In a control system, an image data acquisition unit acquires thermal image data from an infrared sensor. A statistical data generation unit generates statistical data about pixel values from the thermal image data. A calibration control unit controls, based on an environmental temperature, calibration for a sensor output value of the thermal image data in a state where a shutter is closed, the shutter blocking light incident on the infrared sensor. An image data output unit outputs image data related to the thermal image resulting from the calibration. In a case where the pixel values included in the statistical data include an upper limit value or a lower limit value, the upper limit value or the lower limit value being set in advance, the calibration control unit controls the calibration to be performed for an adjustment value which results from shift adjustment based on a shift amount set in advance.

6 Claims, 10 Drawing Sheets

CONTROL SYSTEM AND CONTROL METHOD

CROSS REFERENCE TO RELATED APPLICATION

The present application is based upon and claims the benefit of priority from Japanese Patent Application No. 2021-187860, filed on Nov. 18, 2021, the disclosure of which are incorporated herein in its entirety by reference.

BACKGROUND

The present invention relates to a control system and a control method. Many products have been developed which use an infrared camera for a moving body such as a vehicle for the purpose of detecting an object such as an obstacle or a pedestrian. Infrared sensors such as a microbolometer for use in such an infrared camera are susceptible to characteristic changes by being affected by a change in an environmental temperature or the like. Thus, it is devised to maintain predetermined accuracy by appropriately calibrating an output signal of the infrared camera.

For example, techniques have been disclosed in which a surface temperature of a shutter for opening and closing an opening, through which light enters image-capturing elements, is measured and an offset correction value for each of the image-capturing elements is thereby corrected based on a difference between the measured surface temperature and a reference temperature (Japanese Unexamined Patent Application Publication No. 2007-174113 and Japanese Unexamined Patent Application Publication No. 2007-201807).

Further, a technique has been disclosed in which an offset correction value and a gain correction value are stored, the offset correction value being for correcting an output value at a predetermined temperature with respect to each image-capturing element, the gain correction value being for correcting a difference between output values at a predetermined temperature change rate with respect to each image-capturing element, and the stored offset correction value for each image-capturing element is thereby updated based on image data captured by taking an image of a surface of a shutter (Japanese Unexamined Patent Application Publication No. 2007-336288).

SUMMARY

Incidentally, for the above-described infrared camera, a measurable temperature range for enhancing detection accuracy of an obstacle, a pedestrian, or the like is set to approximately 10 degrees Celsius to 50 degrees Celsius, for example.

However, the infrared camera might be exposed to a lower environmental temperature or a higher environmental temperature than the measurable range. In a case where calibration of an infrared sensor is performed under such an environment, the calibration might not correctly be performed.

The present embodiment has been made to solve such a problem and provides a control system and so forth that suitably calibrate an infrared sensor and thereby suppress degradation of an image.

A control system according to the present embodiment includes: an image data acquisition unit; a statistical data generation unit; a calibration control unit; and an image data output unit. The image data acquisition unit acquires thermal image data including a sensor output value related to a thermal image from an infrared sensor for capturing the thermal image. The statistical data generation unit generates statistical data about pixel values related to the sensor output value from the thermal image data. The calibration control unit controls, based on an environmental temperature, calibration for the sensor output value of the thermal image data in a state where a shutter is closed, the shutter blocking light incident on the infrared sensor. The image data output unit outputs image data related to the thermal image resulting from the calibration. In a case where the pixel values included in the statistical data include an upper limit value or a lower limit value, the upper limit value or the lower limit value being set in advance, the calibration control unit performs shift adjustment for the sensor output value based on a shift amount, which is set in advance, and controls the calibration to be performed for an adjustment value resulting from the shift adjustment.

A control method according to the present embodiment causes a computer to execute: an image data acquisition step; a statistical data generation step; a calibration control step; and an image data output step. In the image data acquisition step, thermal image data including a sensor output value related to a thermal image are acquired from an infrared sensor for capturing the thermal image. In a statistical data generation step, statistical data about pixel values related to the sensor output value are generated from the thermal image data. In the calibration control step, calibration for the sensor output value of the thermal image data in a state where a shutter is closed, the shutter blocking light incident on the infrared sensor, is controlled based on an environmental temperature. In the image data output step, image data related to the thermal image resulting from the calibration are output. In the calibration control step, in a case where the pixel values included in the statistical data include an upper limit value or a lower limit value, the upper limit value or the lower limit value being set in advance, shift adjustment is performed for the sensor output value based on a shift amount which is set in advance, and the calibration to be performed for an adjustment value resulting from the shift adjustment is controlled.

The present embodiment can provide a control system and so forth that suitably calibrate an infrared sensor and thereby suppress degradation of an image.

DETAILED DESCRIPTION

Figure 1:
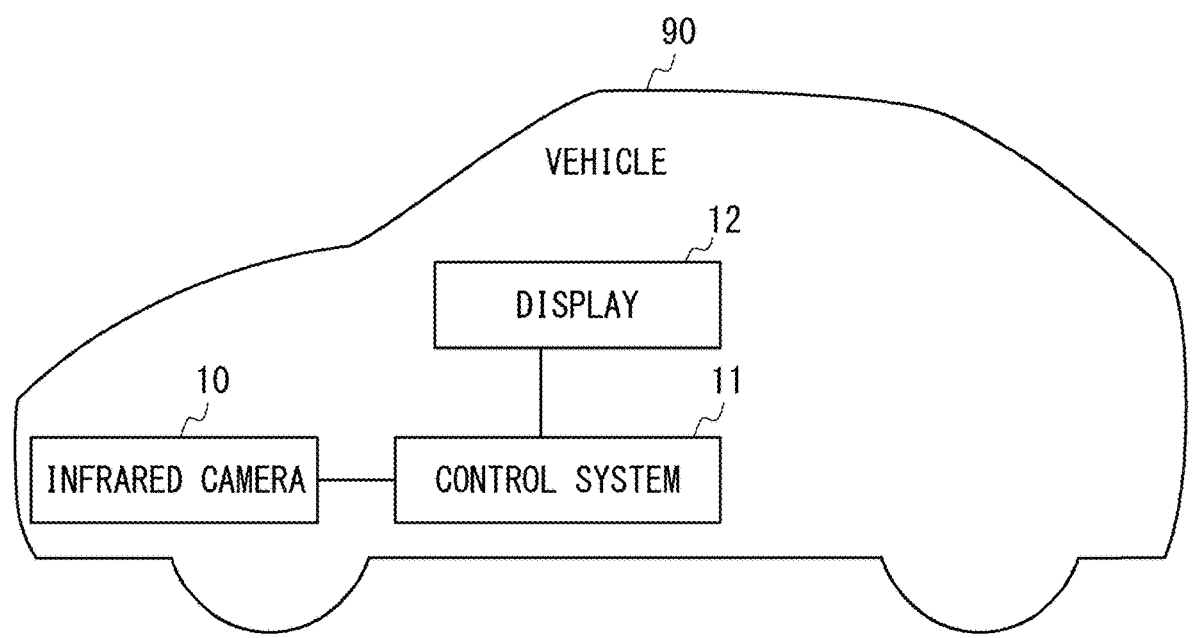
FIG. 1 is a configuration diagram of a vehicle on which a control system according to a first embodiment is mounted.

The present invention will hereinafter be described through embodiments of the invention, but the invention according to claims is not limited to the following embodiments. Further, all of configurations described in the embodiments are not necessarily essential as means for solving problems. For the purpose of clarifying explanations, the following descriptions and drawings will appropriately be skipped and simplified. Note that in the drawings, the same reference characters will be given to the same elements, and repetitions of descriptions thereof will be skipped as needed.

First Embodiment

Embodiments of the present invention will hereinafter be described with reference to the drawings. FIG. 1 is a configuration diagram of a vehicle on which a control system according to a first embodiment is mounted. The control system according to the present embodiment controls an infrared camera provided on a vehicle. A vehicle 90 illustrated in FIG. 1 includes an infrared camera 10, a control system 11, and a display 12.

The infrared camera 10 is provided on the vehicle 90 so as to take an image of a periphery of the vehicle 90. The infrared camera 10 is fixed to a front section of the vehicle 90, for example, and takes an image of a front area of the vehicle 90. The infrared camera 10 is connected with the control system 11 to be capable of communication, receives a predetermined instruction signal from the control system 11, and operates in accordance with the received instruction signal. Further, the infrared camera 10 supplies the control system 11 with image data (also referred to as thermal image data) related to an image (also referred to as a thermal image) captured by the infrared camera 10.

The control system 11 is fixed to an arbitrary place of the vehicle 90 and is connected with the infrared camera 10 and the display 12 to be capable of communicating with each of those. The control system 11 controls the infrared camera 10, acquires image data generated by the infrared camera 10, and causes the display 12 to display the acquired image data.

The display 12 is a display apparatus including a liquid crystal panel or an organic electroluminescence panel, for example, and is provided in a position, in which the display 12 is viewable for a driver, in the vehicle 90. The display 12 displays an image, which is captured by the infrared camera 10, via the control system 11.

In the above configuration, the control system 11 causes the display 12 to display the image captured by the infrared camera 10 in a manner in which the image is viewable for the driver. Accordingly, the control system 11 can cause the driver to recognize an object around the vehicle 90.

Figure 2:
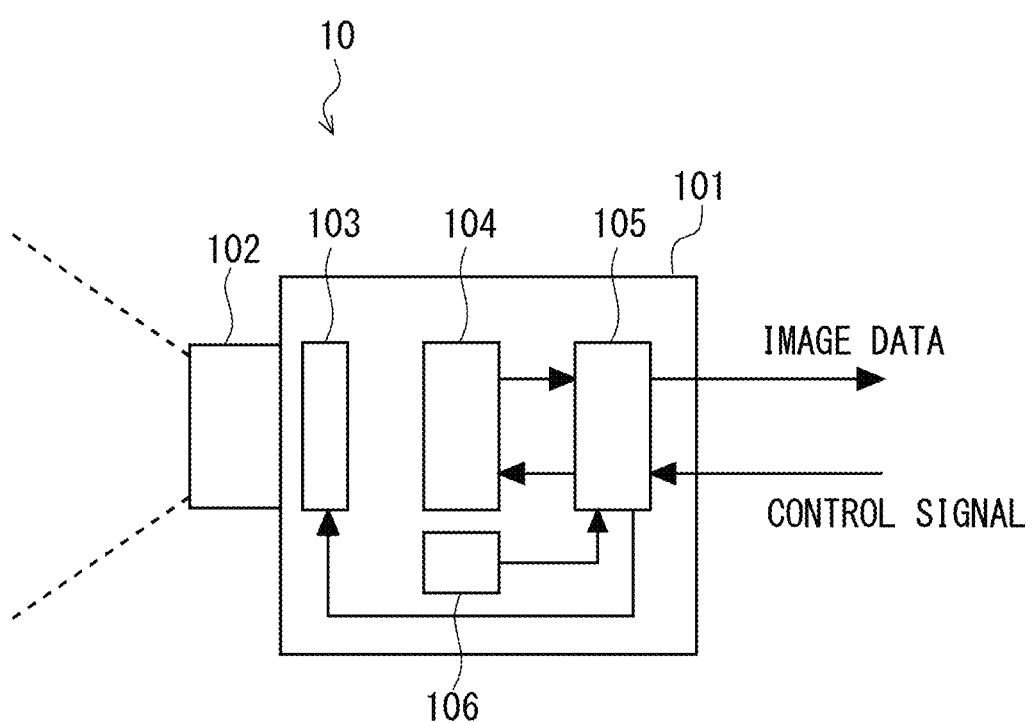
FIG. 2 is a configuration diagram of an infrared camera.

Next, a configuration of the infrared camera 10 will be described with reference to FIG. 2. FIG. 2 is a configuration diagram of the infrared camera. The infrared camera 10 illustrated in FIG. 2 has, as main configurations, a housing 101, an objective lens 102, a shutter 103, an infrared sensor 104, a camera control circuit 105, and a temperature sensor 106.

The housing 101 houses each of the configurations of the infrared camera 10 and is fixed to the vehicle 90. The objective lens 102 receives an infrared ray incident from a range in which the infrared camera 10 takes an image and projects the infrared ray onto the infrared sensor 104. The shutter 103 includes a light shielding plate material and is interposed between the objective lens 102 and the infrared sensor 104 to be capable of opening and closing. The light shielding plate material is metal painted in black, aluminum for which a black anodizing treatment is performed, or the like, for example.

In a closed state, the shutter 103 shields the infrared sensor 104 from light incident from the objective lens 102 on the infrared sensor 104. On the other hand, in an open state, the shutter 103 does not shield the infrared sensor 104 from the light incident from the objective lens 102 on the infrared sensor 104. Further, the shutter 103 is a thermally uniform black body when seen from the infrared sensor 104 and performs calibration of the infrared sensor 104 in a state where the shutter 103 is closed.

The infrared sensor 104 is formed from heat sensitive elements which are arranged in an array-like manner, receives infrared light which is incident via the objective lens 102, and generates the image data by respective changes in resistance values of the heat sensitive elements. That is, the image data generated by the infrared sensor 104 include output values of the heat sensitive elements which are arranged in the array-like manner. The infrared sensor 104 is connected with the camera control circuit 105 to be capable of communication and operates while receiving a predetermined control signal from the camera control circuit 105. When the image data are generated, the infrared sensor 104 supplies the generated image data to the camera control circuit 105.

Further, the infrared sensor 104 in the present disclosure is set to output a sensor output value in consideration of a shift amount, which is set in advance, when the infrared sensor 104 receives an instruction for shift adjustment from the control system 11. Further, the infrared sensor 104 in the present disclosure outputs a sensor output value, in which the above-described shift adjustment is canceled, when the infrared sensor 104 receives an instruction for canceling the shift adjustment from the control system 11.

Note that when the infrared sensor 104 receives more intense sunlight than a predetermined intensity for a predetermined period or longer, outputs of the elements in a range receiving the sunlight are saturated, and abnormal states such as irreversible deformation of the elements or changes in characteristics occur. Thus, in addition to the purpose of performing the above-described calibration, the infrared camera 10 has the shutter 103 also for the purpose of protecting the infrared sensor 104 from direct sunlight.

Note that as for a dynamic range of pixel values which is set for displaying the sensor output value of the infrared sensor 104 on the display 12, resolution is set such that an object such as a pedestrian can suitably be recognized. Thus, in the infrared sensor 104, the pixel values as detection signals might be saturated even in a temperature range in which the above-described abnormal state does not occur.

The camera control circuit 105 is a control circuit including an MCU (microcontroller unit) and controls the shutter 103 and the infrared sensor 104. Further, the camera control circuit 105 is connected with the control system 11 to be capable of communication, receives a control signal from the control system 11, and controls each of the configurations of the infrared camera 10 in accordance with the received control signal. In a case where the infrared camera 10 does not take an image, the camera control circuit 105 performs control so as to maintain the state where the shutter 103 is closed. In a case where the infrared camera 10 takes an image, the camera control circuit 105 performs control so as to establish a state where the shutter 103 is open. In this case, the camera control circuit 105 supplies the control system 11 with the image data including the sensor output value which is generated by the infrared sensor 104.

Further, the camera control circuit 105 temporarily closes the shutter 103 under a predetermined condition. The predetermined condition is a case where the shutter 103 is temporarily closed for the purpose of protecting the infrared sensor 104 or a case where the calibration is performed, for example. In this case, for example, the camera control circuit 105 receives an instruction for temporarily closing the shutter 103 from the control system 11. Further, in a case where the shutter 103 is closed for performing the calibration, the camera control circuit 105 supplies the control system 11 with thermal image data related to a thermal image (also referred to as a shutter image) captured by taking an image of the shutter 103 in the closed state.

The camera control circuit 105 is connected with the temperature sensor 106 to be capable of communication and receives measurement data about a temperature of an internal portion of the infrared camera 10 from the temperature sensor 106. Further, the camera control circuit 105 supplies the measurement data received from the temperature sensor 106 to the control system 11.

The temperature sensor 106 is installed in the internal portion of the infrared camera 10, measures a temperature of the infrared camera 10, and supplies the measurement data to the camera control circuit 105. It is preferable that the temperature sensor 106 be installed in the vicinity of the infrared sensor 104.

Figure 3:
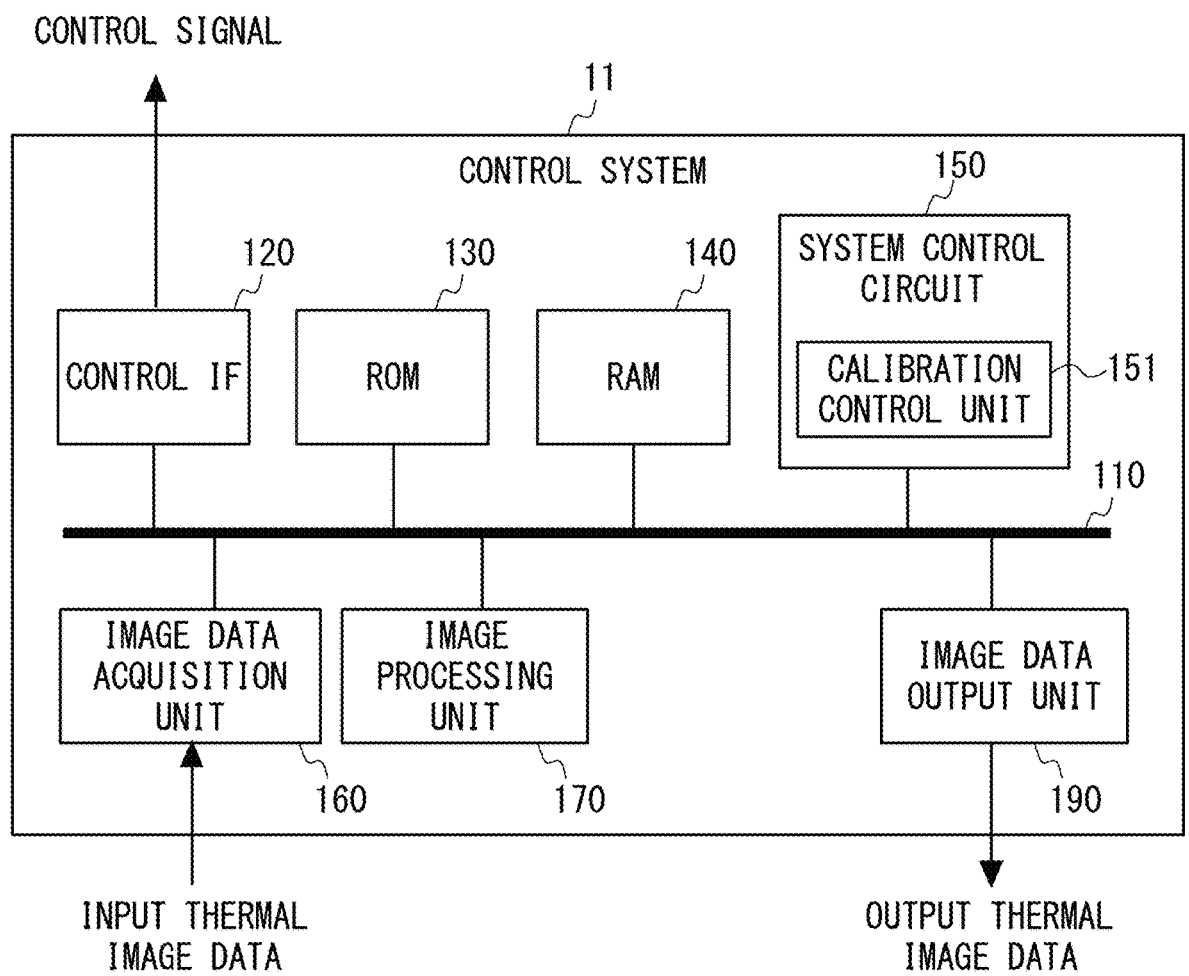
FIG. 3 is a block diagram of the control system according to the first embodiment.

Next, the control system 11 will be described with reference to FIG. 3. FIG. 3 is a block diagram of the control system according to the first embodiment. The control system 11 has, main configurations, a control IF 120, a ROM 130, a RAM 140, a system control circuit 150, an image data acquisition unit 160, an image processing unit 170, and an image data output unit 190. Further, those configurations are connected together to be capable of appropriately performing communication via a bus 110.

The control IF 120 is an interface of a communication line for controlling the infrared camera 10. The control IF 120 supplies the infrared camera 10 with a control signal by which the control system 11 controls the infrared camera 10.

The ROM 130 (ROM (read-only memory)) is a non-volatile memory which stores information or data which is set in advance. The ROM 130 in advance stores programs by which the control system 11 realizes functions according to the present embodiment, for example.

The RAM 140 (RAM (random-access memory)) is a volatile memory that has a storage area in which the control system 11 can temporarily expand data. The RAM 140 may be a DRAM (dynamic random-access memory), for example, or may include a register accompanying the system control circuit 150 or the like. The RAM 140 includes an area in which programs stored in the ROM 130 are expanded and executed. Further, the RAM 140 can be used in a case where the image data supplied from the infrared camera 10 are processed, or the like, for example.

The system control circuit 150 includes an arithmetic apparatus such as a CPU (central processing unit) or an MPU (micro-processing unit) and controls each of the configurations provided in the control system 11. Further, the system control circuit 150 outputs a predetermined instruction to the infrared camera 10 or the display 12. That is, the system control circuit 150 receives a predetermined signal from each of the configurations provided in the control system 11 and performs predetermined decision, computation, and so forth based on the received signal. Alternatively, the system control circuit 150 outputs results of predetermined decision, computation, and so forth based on the signals, which are received from the configurations, to the configurations. The system control circuit 150 includes a calibration control unit 151 as a function block.

The calibration control unit 151 performs control about a calibration process for the infrared sensor 104. More specifically, for example, in the state where the shutter 103 is closed, that is, in a state where the light incident on the infrared sensor 104 is blocked, the calibration control unit 151 controls calibration for the sensor output value in the thermal image data of the shutter image. In this case, the calibration control unit 151 controls the calibration by using data about the environmental temperature, which are acquired from the temperature sensor 106.

Further, in a case where pixel values related to the sensor output value include an upper limit value or a lower limit value which is set in advance, the calibration control unit 151 performs the shift adjustment for the sensor output value. The shift adjustment is a process of adding or subtracting a shift amount, which is set in advance, to or from the sensor output value. The shift amount is a value which is set for performing the shift adjustment. The calibration control unit 151 controls the calibration which is performed for an adjustment value resulting from the shift adjustment.

In addition, after performing the calibration for the above-described adjustment value, the calibration control unit 151 cancels the shift adjustment which is performed for the sensor output value. That is, in a case where the shift adjustment is performed in a calibration process, the calibration control unit 151 performs control such that the shift adjustment is canceled when the calibration process is completed and the image data related to the thermal image, in which the shift adjustment is canceled, are supplied to the image data output unit 190.

The image data acquisition unit 160 is an interface which acquires the thermal image data (input thermal image data) as data related to the thermal image from the infrared camera 10. The image data acquisition unit 160 periodically acquires the image data from the infrared camera 10, for example. For example, the image data acquisition unit 160 receives an image for 1 frame at every $\frac{1}{15}$ second. When the image data acquisition unit 160 receives the image data, the image data acquisition unit 160 supplies the received image data to the image processing unit 170.

The image processing unit 170 is an image processing circuit including a GPU (graphics processing unit), for example. The image processing unit 170 carries out a predetermined process for the thermal image data in cooperation with the RAM 140. Details of the image processing unit 170 will be described later.

The image data output unit 190 is an interface for outputting the image data (output thermal image data) processed by the image processing unit 170 to the display 12. The image data to be output by the image data output unit 190 are output in accordance with data format corresponding to specifications of the display 12. The data format is HDMI (High-Definition Multimedia Interface®), DVI (digital visual interface), or the like, for example. The image data output unit 190 outputs the image data related to the thermal image resulting from the calibration. Note that the image data output unit 190 may be set so as not to output the image data related to the shutter image.

Figure 4:
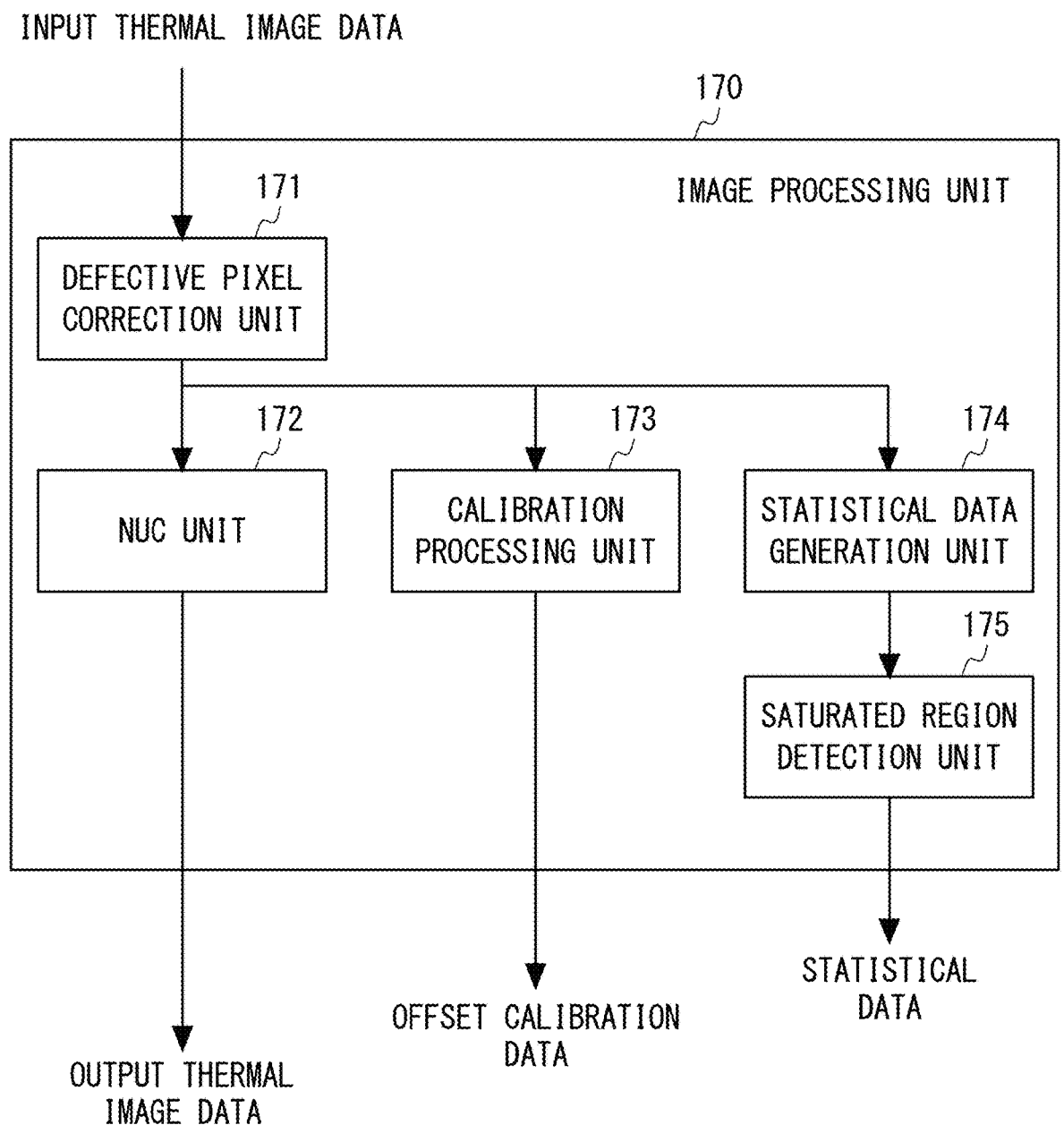
FIG. 4 is a block diagram of an image processing unit according to the first embodiment.

Next, the image processing unit 170 will be described with reference to FIG. 4. FIG. 4 is a block diagram of the image processing unit 170 according to the first embodiment. The image processing unit 170 executes a predetermined process in cooperation with the RAM 140 and the system control circuit 150. The image processing unit 170 has, as main configurations, a defective pixel correction unit 171, an NUC unit 172, a calibration processing unit 173, a statistical data generation unit 174, and a saturated region detection unit 175.

The defective pixel correction unit 171 in advance stores a defective pixel of the infrared sensor 104 and carries out a process (interpolation process) for interpolating a pixel value of the stored defective pixel from pixel values of peripheral pixels. The defective pixel correction unit 171 receives the input thermal image data from the infrared camera 10 via the image data acquisition unit 160 and carries out the above-described interpolation process for the received image data. The defective pixel correction unit 171 supplies the image data, for which the interpolation process is carried out, to the NUC unit 172, the calibration processing unit 173, and the statistical data generation unit 174.

The NUC unit 172 performs NUC (non-uniformity correction) as a correction process for suppressing non-uniformity of pixel values which are output with respect to input light. The NUC unit 172 is in advance provided with settings of a gain and an offset value that correspond to characteristics which each pixel of the infrared sensor 104 has. For the image data received from the defective pixel correction unit 171, the NUC unit 172 corrects each pixel value in an image captured by the infrared camera 10 in accordance with the settings provided in advance. That is, the control system 11 improves an image quality of the image captured by the infrared camera 10 via the defective pixel correction unit 171 and the NUC unit 172.

Further, after the control system 11 performs the calibration process for the shutter image, the NUC unit 172 suppresses degradation of the image quality of the thermal image data by using offset calibration data which are generated by the calibration process. More specifically, in a case where the RAM 140 stores the offset calibration data, the NUC unit 172 performs offset correction by using the above data. When the offset calibration data stored in the RAM 140 are updated, the NUC unit 172 uses the updated offset calibration data.

The calibration processing unit 173 provides a function for calibrating an offset process in the correction process which is performed by the NUC unit 172 by using the shutter image. The calibration processing unit 173 receives the image data of the shutter image, for which interpolation of the defective pixel is carried out, from the defective pixel correction unit 171 and performs a predetermined calibration process for the received image data. The calibration processing unit 173 performs the calibration process, thereby outputs the offset calibration data for calibrating the offset process which is carried out by the NUC unit 172, and causes the RAM 140 to store the offset calibration data.

The statistical data generation unit 174 receives the image data, for which interpolation of the defective pixel is carried out, from the defective pixel correction unit 171, tallies the respective pixel values for the pixels in the received image data, and thereby generates statistical data. The statistical data generation unit 174 calculates a maximum value, a minimum value, or an average value (also referred to as a frame average value) of data output values in the received image data, for example, and thereby generates the statistical data. The statistical data include at least data about the maximum value of the data output values in the image data. When the statistical data generation unit 174 generates the statistical data, the statistical data generation unit 174 supplies the generated statistical data to the saturated region detection unit 175.

The saturated region detection unit 175 receives the statistical data from the statistical data generation unit 174 and detects a saturated region from the received statistical data. The saturated region is a region where a saturated pixel or a substantially saturated pixel is present. The saturated pixel denotes a pixel in a state where its pixel value becomes the upper limit value. For example, in a case where a luminance level of each pixel of photo data is expressed by 14 bits which represent 0 to 16,383, the pixel at coordinates where the luminance level has a value of 16,383 is referred to as the saturated pixel. Note that the definition of the saturated pixel, which is mentioned here, is one example, and the saturated pixel is not limited by the above-described definition.

The saturated region detection unit 175 may decide one saturated pixel as the saturated region or may decide the saturated region as present in a case where it is detected that four neighboring pixels are the saturated pixels, for example. Alternatively, for example, in a case where 9 or more adjacent pixels are at 98% or higher of an upper limit of a luminance value, the saturated region detection unit 175 may decide the saturated region as present.

In a case where it is detected that the saturated region is present in the received photo data, the saturated region detection unit 175 outputs the statistical data, which include a signal indicating a detection result of the saturated region, to the system control circuit 150. The above statistical data may include the sensor output value. Further, the statistical data may include data about a position of the pixel which is determined to be the saturated region. Further, in a case where the saturated region detection unit 175 does not decide the saturated pixel as detected from the image data, the saturated region detection unit 175 outputs a signal, which indicates that no saturated pixel is present, to the system control circuit 150.

Figure 5:
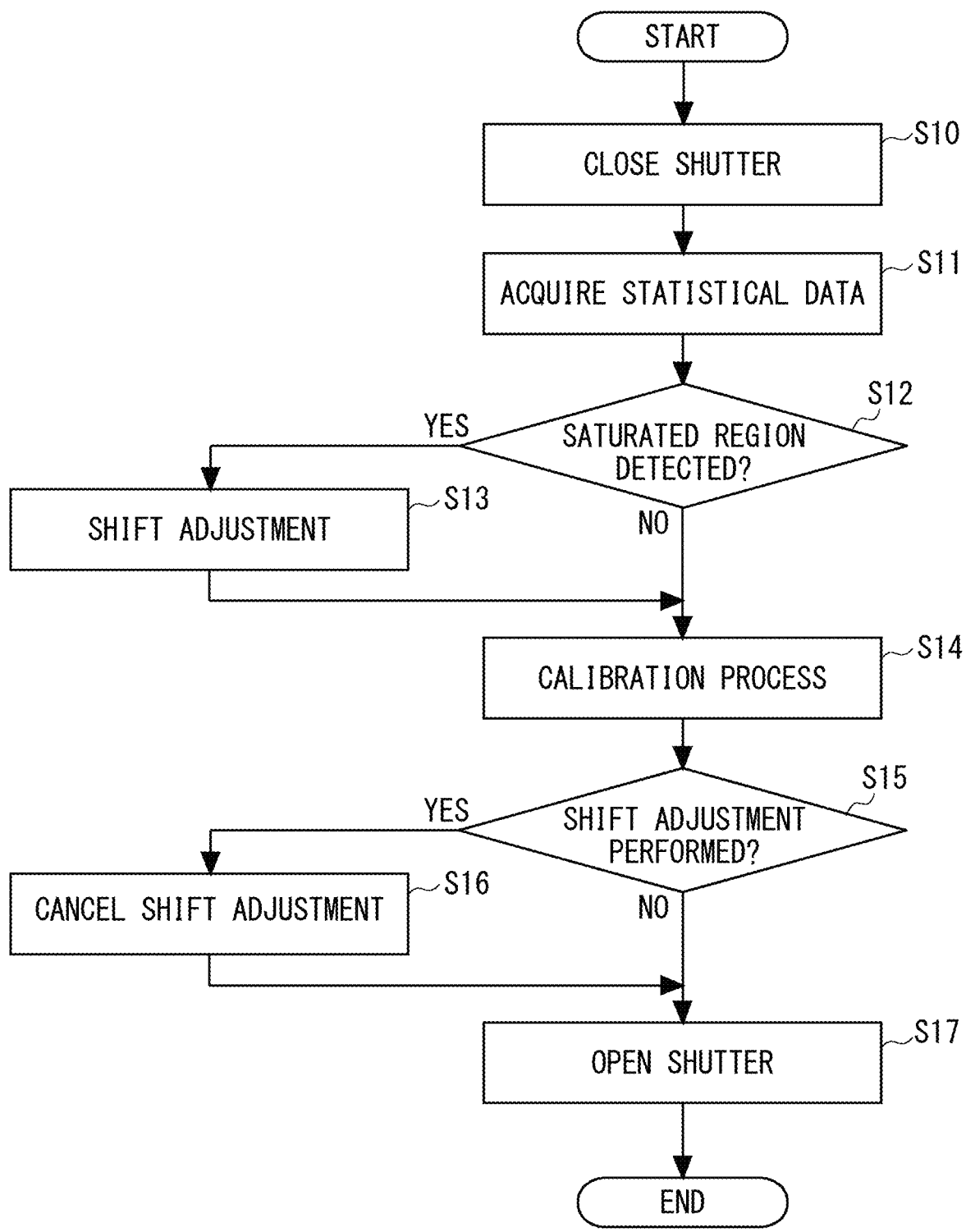
FIG. 5 is a flowchart of a control method according to the first embodiment.

Next, a process to be executed by the control system 11 will be described with reference to FIG. 5. FIG. 5 is a flowchart of a control method according to the first embodiment. The flowchart illustrates a process by the calibration control unit 151. The flowchart is repeatedly executed at timings when the calibration of the infrared sensor 104 is executed after image-taking by using the infrared camera 10 is started, for example.

Note that the process illustrated in the following flowchart includes processes to be executed by the configurations of the infrared camera 10 or the control system 11 in response to instructions given by the calibration control unit 151. However, in the present disclosure, the subject of the processes which the calibration control unit 151 causes the other configurations to execute might be expressed as the system control circuit 150 or the calibration control unit 151.

First, in order to start the calibration of the infrared sensor 104, the calibration control unit 151 of the system control circuit 150 supplies the instruction signal for closing the shutter 103 to the infrared camera 10 (step S10). When the infrared camera 10 receives the instruction from the system control circuit 150, the infrared camera 10 closes the shutter 103. Further, the infrared camera 10 supplies the control system 11 with the thermal image data related to the shutter image captured by taking an image of the closed shutter 103.

The control system 11 receives the thermal image data of the shutter image from the infrared camera 10 and generates the statistical data of the shutter image. The calibration control unit 151 acquires the statistical data from the image processing unit 170 (step S11).

Next, the calibration control unit 151 reads the statistical data and determines whether or not the saturated region is detected in the thermal image data captured by taking an image of the shutter 103 (step S12). In a case where it is not determined that the saturated region is detected in the thermal image data captured by taking an image of the shutter 103 (NO in step S12), the calibration control unit 151 progresses to step S14. In a case where it is determined that the saturated region is detected in the thermal image data captured by taking an image of the shutter 103 (YES in step S12), the calibration control unit 151 progresses to step S13.

In step S13, the calibration control unit 151 performs the shift adjustment for the sensor output value based on the shift amount which is set in advance (step S13). More specifically, the calibration control unit 151 instructs the infrared camera 10 to output the sensor output value resulting from the shift adjustment by a predetermined shift amount. The calibration control unit 151 performs control about the shift adjustment and then progresses to step S14.

In step S14, the calibration control unit 151 controls the calibration process for the shutter image (step S14). Here, while referring to the environmental temperature, the calibration processing unit 173 performs the calibration for the sensor output value of the thermal image data in a state where the shutter is closed, the shutter blocking the light incident on the infrared sensor. In the calibration process, the calibration processing unit 173 calculates an offset calibration value for each element of the infrared sensor 104 from the pixel values related to the shutter image.

Next, the calibration control unit 151 determines whether or not the thermal image data related to the calibration are the thermal image data resulting from the shift adjustment (i.e. whether or not the thermal image data have been performed the shift adjustment) (step S15). In a case where it is not determined that the thermal image data related to the calibration are the thermal image data resulting from the shift adjustment (NO in step S15), the calibration control unit 151 progresses to step S17. In a case where it is determined that the thermal image data related to the calibration are the thermal image data resulting from the shift adjustment (YES in step S15), the calibration control unit 151 progresses to step S16.

In step S16, the calibration control unit 151 cancels the shift adjustment (step S16) and progresses to step S17. More specifically, the calibration control unit 151 supplies an instruction signal for canceling the shift adjustment to the infrared camera 10.

In step S17, the calibration control unit 151 performs control for opening the shutter 103 (step S17). More specifically, the calibration control unit 151 supplies an instruction signal for opening the shutter to the infrared camera 10. The calibration control unit 151 thereafter finishes a series of processes about the calibration for the infrared sensor 104.

In the above, a description is made about the processes executed by the calibration control unit 151 in the first embodiment. By the control method of the control system 11, the control method including the above-described processes, even in a case where the sensor output value of the infrared sensor 104 exceeds the upper limit due to a high-temperature environment, the control system 11 suitably calibrates the infrared sensor and suppresses degradation of the image.

Figure 6:
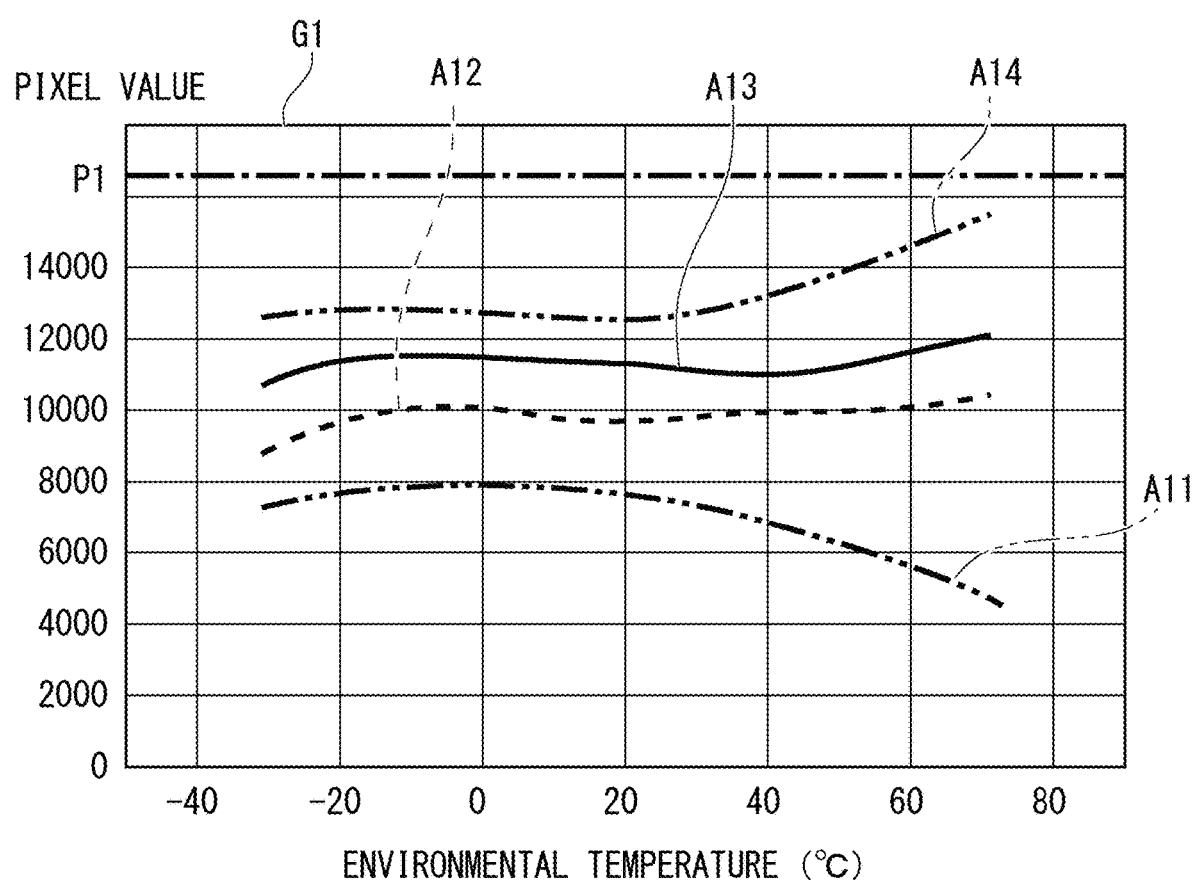
FIG. 6 is a diagram illustrating an example of a relationship between an environmental temperature and a pixel value in the control system.

Next, characteristics of the infrared sensor 104 will be described with reference to FIG. 6. FIG. 6 is a graph illustrating an example of a relationship between the environmental temperature and the pixel value in the control system 11. The horizontal axis of a graph G1 illustrated in FIG. 6 represents the environmental temperature of the infrared sensor 104. It is assumed that the infrared sensor 104 is used between −40° C. and 80° C. as the environmental temperature, for example. Thus, on the horizontal axis of the graph G1, temperatures of −40° C. to 80° C. are set. The vertical axis of the graph G1 represents the pixel value of the thermal image data generated by the infrared sensor 104. The control system 11 processes the sensor output value as the pixel value of 14 bits which represent luminance levels of 0 to 16,383, for example. In a case of such an example, an upper limit value P1 of the pixel value which is indicated on the vertical axis is 16,383.

In the graph G1, four curves A11 to A14 extending in a left-right direction are indicated. The curve A11, which is plotted with a dot-dot-dash line in a lowest portion of the graph G1, represents minimum pixel values which can be taken in a case where the infrared sensor 104 takes an image of a blackbody furnace at 10° C. In the curve A11, its value is plotted around an intermediate value of the vertical axis around −40° C. and is plotted in a lower area of the pixel value around 80° C.

The curve A14, which is plotted with a dot-dot-dash line in a highest portion of the graph G1, represents maximum pixel values which can be taken in a case where the infrared sensor 104 takes an image of the blackbody furnace at 50° C. In the curve A14, its value is plotted around the intermediate value around −40° C., gradually becomes higher, and is plotted slightly below P1 as the upper limit value of the pixel value around 80° C.

As indicated by the above-described curve A11 and curve A14, the infrared sensor 104 is set so as to be capable of detecting temperatures of 10° C. to 50° C. at environmental temperatures in a range of −40° C. to 80° C. Further, as indicated by the curve A11 to the curve A14, in the infrared sensor 104, non-uniformity of the pixel values becomes large in a comparatively high temperature zone. For example, at an environmental temperature of 40° C., the control system 11 detects temperatures of 10° C. to 50° C. as a desired measurement temperature range by using a range of pixel values of 5,000 to 14,000. A range of the pixel values for detecting the desired measurement temperature range (10° C. to 50° C.) in the above case will be referred to as a measurement pixel value zone. The control system 11 is set such that the measurement pixel value zone does not exceed the upper limit value P1. Note that the measurement pixel value zone may be referred to as a scene dynamic range.

Further, the curve A12, which is plotted with a broken line above the curve A11 in the graph G1, represents average pixel values related to the pixels of the whole image when captured by taking an image of the blackbody furnace at 10° C. The curve A13, which is indicated by a solid line between the curve A12 and the curve A14, represents the average pixel values related to the pixels of the whole image when captured by taking an image of the blackbody furnace at 50° C.

As for the control system 11, the sensor output value is corrected in accordance with a gain and an offset amount which are set in advance in the NUC unit 172, but the characteristics of the infrared sensor 104 are changed due to an influence of a change in the environmental temperature or the like. Accordingly, the control system 11 performs the calibration process by using the thermal image captured by taking an image of the shutter 103. In the calibration process performed by the calibration processing unit 173, the pixel values of the infrared sensor 104 are calibrated so as to become values along the above-described curve A12 or curve A13, for example.

In the infrared sensor 104 set as described above, the temperature of the shutter 103 might exceed 70° C. when the environmental temperature is 70° C., for example. When the control system 11 performs the calibration in such a situation, the sensor output value of the thermal image captured by taking an image of the shutter 103 becomes high, and accompanying this, the pixel values of several pixels might become a saturated state. In such a case, a process for calibrating the pixel values of the thermal image captured by taking an image of the shutter 103 might not correctly be performed.

Accordingly, in a case where presence of the pixel value indicating the upper limit is detected, the control system 11 according to the present embodiment performs the shift adjustment and thereby adjusts the sensor output value such that the pixel value falls below the upper limit value P1, for example. It is further preferable that the control system 11 perform the shift adjustment for the sensor output value such that the sensor output value falls below the curve A14. The control system 11 performs the calibration by using the pixel values related to the sensor output value resulting from the shift adjustment and cancels the shift adjustment after the calibration. By performing such a process, the control system 11 can suitably perform the calibration process for the pixels in the saturated state in the thermal image captured by taking an image of the shutter 103.

Note that in a technique according to the present embodiment, the above-described process about the upper limit value may be applied to the lower limit value which is set in advance. That is, in a case where the pixel value corresponding to the sensor output value related to the thermal image captured by taking an image of the shutter 103 indicates the lower limit value which is set in advance (for example, zero), the control system 11 performs the shift adjustment for the sensor output value and may thereby perform a process such that the pixel value goes above the lower limit value. In this case also, the control system 11 performs the calibration process by using a value resulting from the shift adjustment and cancels the shift adjustment after the calibration process is finished.

In the above, the first embodiment is described. The control system 11 according to the first embodiment is not limited to the above-described form. When the shift adjustment is performed, instead of the infrared camera 10, the control system 11 may have a function for generating the adjustment value resulting from the shift adjustment for the sensor output value.

The control system 11 may have an image recognition unit, and the image recognition unit receives the thermal image data from the image data acquisition unit 160 and detects an image of another vehicle, a pedestrian, an animal, an obstacle, or the like from the thermal image related to the received thermal image data, for example. The control system 11 executes the above-described calibration process and can thereby suppress lowering of accuracy of recognition performed by the image recognition unit.

Note that the above-described infrared sensor 104 may be rephrased as a thermal sensor or a bolometer. The above-described control system 11 may have a configuration which includes at least either one of the infrared camera 10 and the display 12.

In the above, the first embodiment is described. The first embodiment can provide a control system and so forth that suitably calibrate an infrared sensor and thereby suppress degradation of an image.

Second Embodiment

Next, a second embodiment will be described. The second embodiment is different from the first embodiment in the point that a control system in advance stores adjustment information. The adjustment information is information about the shift amount which is set in accordance with the environmental temperature. The control system 11 can store the adjustment information in the ROM 130, for example.

Figure 7:
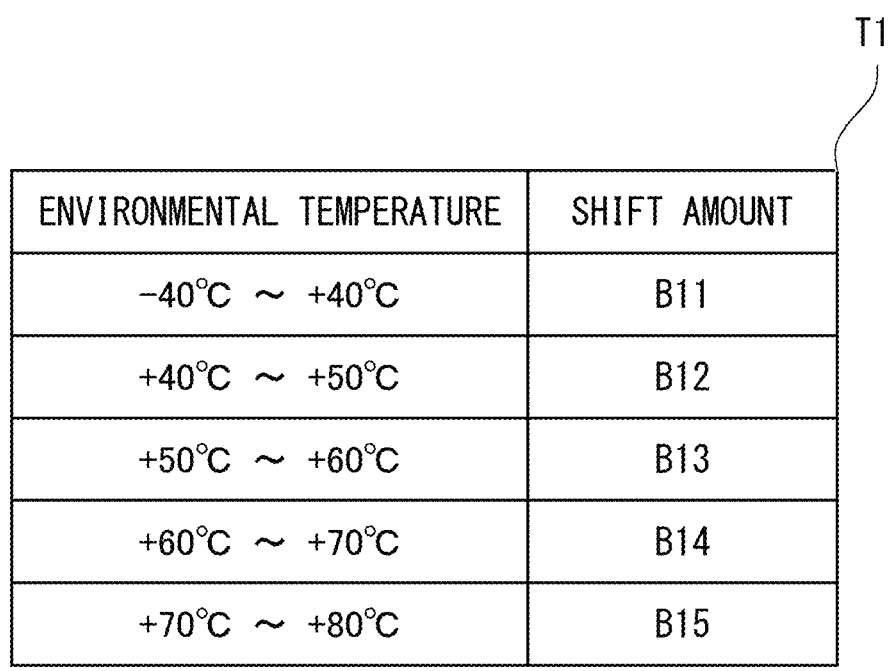
FIG. 7 is a diagram illustrating an example of the adjustment information according to the second embodiment.

FIG. 7 is a diagram illustrating an example of the adjustment information according to the second embodiment. FIG. 7 illustrates a table T1. The table T1 represents ranges of the environmental temperature and shift amounts which correspond to those. The shift amount is an amount which is added to or subtracted from the sensor output value output by the infrared sensor 104 when a control system 11 performs the shift adjustment.

Specifically, for example, the table T1 indicates that the shift amount corresponding to a range of −40° C. to +40° C. is B11. Similarly, the table T1 indicates that the shift amount corresponding to a range of +40° C. to +50° C. is B12 and the shift amount corresponding to a range of +50° C. to +60° C. is B13. In addition, the table T1 indicates that the shift amount corresponding to a range of +60° C. to +70° C. is B14 and the shift amount corresponding to a range of +70° C. to +80° C. is B15.

The control system 11 according to the present embodiment acquires the environmental temperature from the temperature sensor 106 when the calibration process is performed. Further, the control system 11 refers to the above-described adjustment information when the shift adjustment is performed. That is, the calibration control unit 151 of the control system 11 refers to the adjustment information and thereby controls performance of the shift adjustment by using the shift amount corresponding to the environmental temperature.

Figure 8:
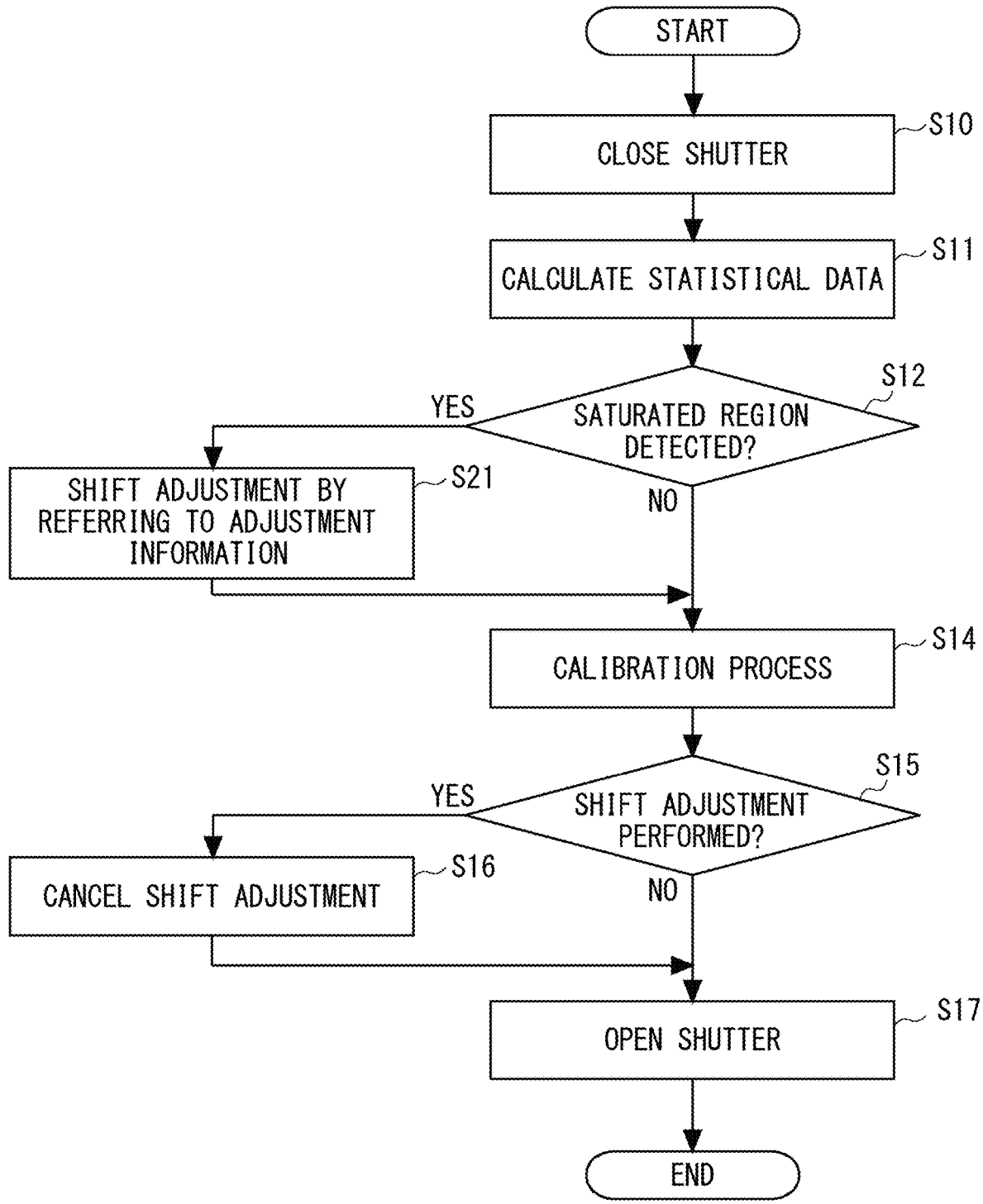
FIG. 8 is a flowchart of a control method according to the second embodiment.

Next, a control method according to the second embodiment will be described with reference to FIG. 8. FIG. 8 is a flowchart of the control method according to the second embodiment. The flowchart illustrated in FIG. 8 is different from the flowchart illustrated in FIG. 5 in the point that step S21 is provided instead of step S13.

In step S12 of the flowchart in FIG. 8, the calibration control unit 151 determines whether or not the saturated region is detected in the thermal image data captured by taking an image of the shutter 103 based on the statistical data. In a case where it is determined that the saturated region is detected in the thermal image data captured by taking an image of the shutter 103 (YES in step S12), the calibration control unit 151 progresses to step S21.

In step S21, the calibration control unit 151 reads the adjustment information, refers to the read adjustment information, and thereby performs the shift adjustment. In this case, the calibration control unit 151 performs the shift adjustment by using the shift amount corresponding to acquired environmental information. The calibration control unit 151 performs the shift adjustment and then progresses to step S14. The subsequent processes are similar to those in the flowchart in FIG. 5.

In the above, the second embodiment is described. The control system 11 according to the second embodiment in advance stores the above-described adjustment information, refers to that, and thereby performs the shift adjustment. Accordingly, the control system 11 can efficiently execute the calibration process accompanying the shift adjustment. That is, the second embodiment can provide a control system and so forth that suitably calibrate an infrared sensor in an efficient manner and thereby suppress degradation of an image.

Third Embodiment

Figure 9:
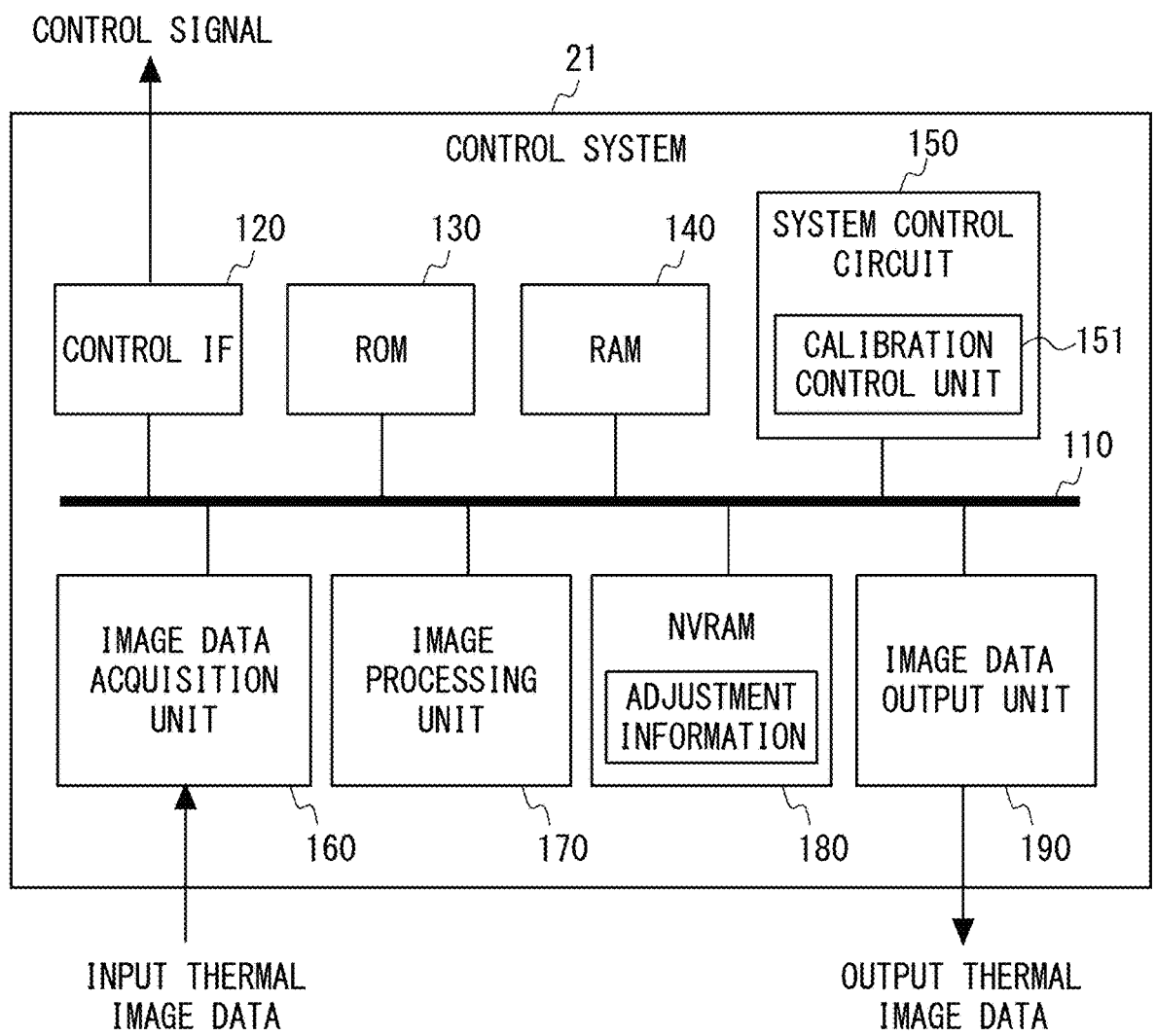
FIG. 9 is a block diagram of a control system according to a third embodiment.

Next, a third embodiment will be described. FIG. 9 is a block diagram of a control system according to the third embodiment. A control system 21 illustrated in FIG. 9 is different from the control system 11 according to the above-described embodiments in the point that the control system 21 further has an NVRAM 180 (non-volatile RAM).

The NVRAM 180 is a rewritable non-volatile memory and includes a storage apparatus such as a flash memory or an EPROM (erasable programmable read-only memory), for example. The NVRAM 180 stores the adjustment information in a rewritable state.

The calibration control unit 151 according to the present embodiment controls performance of the shift adjustment based on the above adjustment information. Further, in a case where the pixel values related to the sensor output value still include the upper limit value or the lower limit value after the shift adjustment is performed in accordance with the shift amount which is set in advance, the calibration control unit 151 additionally performs the shift adjustment. In the shift adjustment which is additionally performed, the calibration control unit 151 performs the following control. That is, the calibration control unit 151 determines an additional shift amount based on the frame average value of the pixel values related to the thermal image captured by taking an image of the shutter and a central value of the measurement pixel value zone at the environmental temperature. The calibration control unit 151 controls performance of the shift adjustment by the determined additional shift amount.

Further, in a case where the shift adjustment is performed by the above-described additional shift amount, the calibration control unit 151 controls performance of an update process for updating the shift amount which is included in the adjustment information stored in the NVRAM 180.

Figure 10:
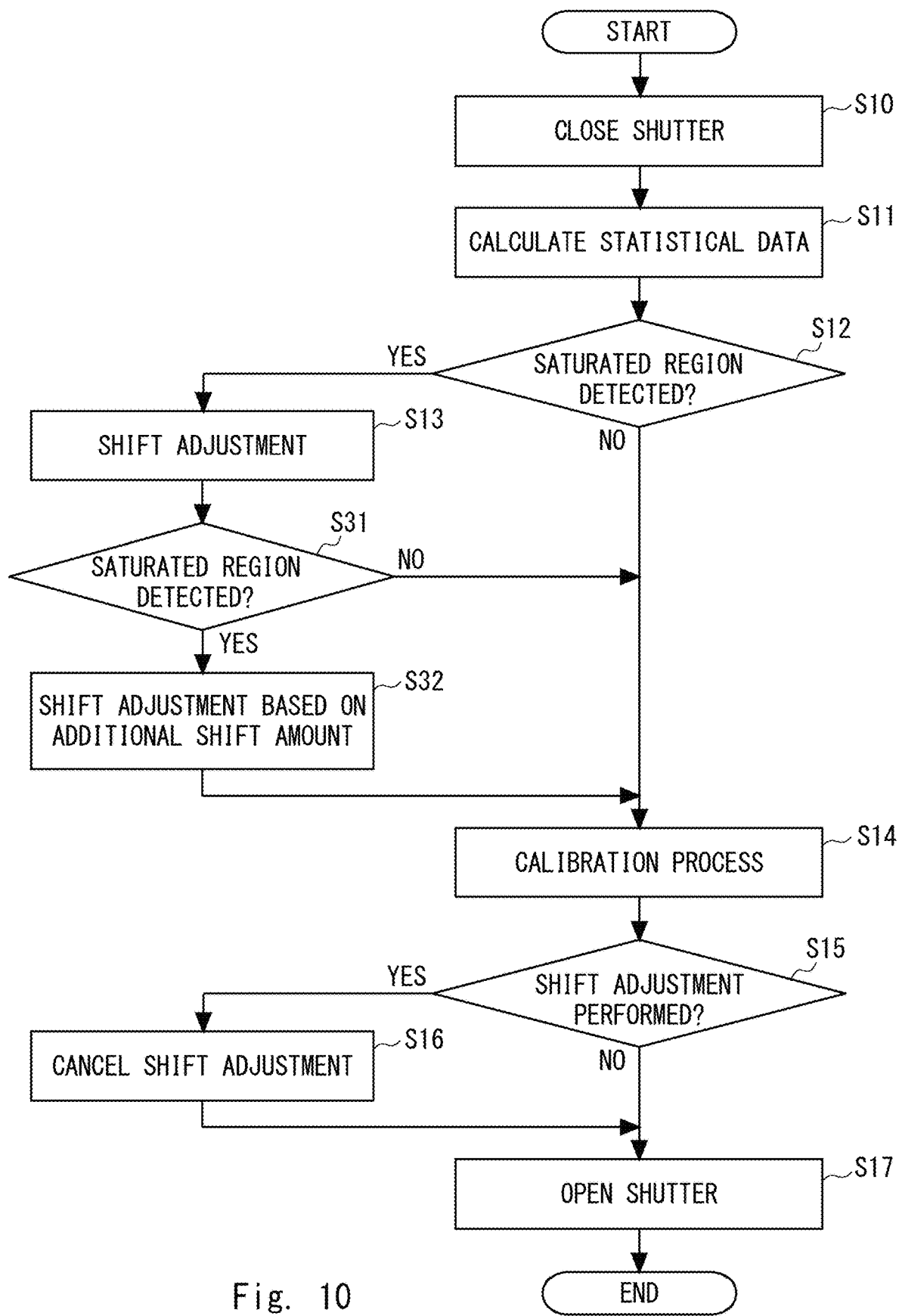
FIG. 10 is a flowchart of a control method according to a third embodiment.

A process by the control system 21 according to the third embodiment will be described with reference to FIG. 10. FIG. 10 is a flowchart of a control method according to the third embodiment. The flowchart illustrated in FIG. 10 is different from the flowchart illustrated in FIG. 5 in the point that step S31 and step S32 are added between step S13 and step S14.

After step S13, the calibration control unit 151 determines whether or not the sensor output value resulting from the shift adjustment still has the saturated region (step S31). In a case where it is not determined that the sensor output value resulting from the shift adjustment has the saturated region (NO in step S31), the calibration control unit 151 progresses to step S14. On the other hand, in a case where it is determined that the sensor output value resulting from the shift adjustment has the saturated region (YES in step S31), the calibration control unit 151 progresses to step S32.

In step S32, the calibration control unit 151 performs the shift adjustment by the additional shift amount (step S32). After performing the shift adjustment by the additional shift amount, the calibration control unit 151 progresses to step S14.

In the above, the process executed by the control system 21 is described. Note that after performing a process in step S32, the calibration control unit 151 causes the adjustment information to reflect data about the additional shift amount and may thereby perform a process for updating the adjustment information. Accordingly, the control system 21 can store the additional shift amount which becomes necessary due to a secular change or the like of the infrared sensor 104 and can perform subsequent processes at a comparatively high speed.

In the above, the third embodiment is described. The third embodiment can provide a control system and so forth that suitably calibrate an infrared sensor and thereby suppress degradation of an image.

Note that the above-described program includes a command group (or a software code) for causing a computer to perform one or more functions described in the embodiments in a case where the program is read by the computer. The program may be stored in a non-transitory computer-readable medium or a tangible storage medium. By way of example and not of limitation, the computer-readable medium or the tangible storage medium includes a random-access memory (RAM), a read-only memory (ROM), a flash memory, a solid-state drive (SSD), or another memory technique. The program may be transmitted through a transitory computer-readable medium or a communication medium. By way of example and not of limitation, the transitory computer-readable medium or the communication medium includes an electric, optical, acoustic, or other type propagation signal.

Note that the present disclosure is not limited to the above embodiments and can appropriately be changed without departing from the scope of the gist thereof.

What is claimed is:

1. A control system comprising:
an image data acquisition unit which acquires thermal image data including a sensor output value related to a thermal image from an infrared sensor for capturing the thermal image;
a statistical data generation unit which generates statistical data about pixel values related to the sensor output value from the thermal image data;
a calibration control unit which controls, based on an environmental temperature, calibration for the sensor output value of the thermal image data in a state where a shutter is closed, the shutter blocking light incident on the infrared sensor; and
an image data output unit which outputs image data related to the thermal image resulting from the calibration,
wherein in a case where the pixel values included in the statistical data include an upper limit value or a lower limit value, the upper limit value or the lower limit value being set in advance, the calibration control unit performs shift adjustment for the sensor output value by a shift amount, which is set in advance, and controls the calibration to be performed for an adjustment value resulting from the shift adjustment.

2. The control system according to claim 1, wherein after the calibration is performed for the adjustment value, the calibration control unit cancels the shift adjustment for the sensor output value.

3. The control system according to claim 1, further comprising a storage unit that stores adjustment information as information about the shift amount which is set in accordance with the environmental temperature, wherein the calibration control unit controls performance of the shift adjustment based on the adjustment information.

4. The control system according to claim 1, wherein in a case where the pixel values related to the adjustment value include the upper limit value or the lower limit value, the calibration control unit determines an additional shift amount based on a frame average value of the pixel values related to the thermal image in a state where the shutter is closed and a central value of a measurement pixel value zone at the environmental temperature and controls performance of the shift adjustment based on the determined additional shift amount.

5. The control system according to claim 4, wherein the calibration control unit controls performance of an update process for updating the shift amount, which is set in advance, based on the additional shift amount.

6. A control method causing a computer to execute:

an image data acquisition step of acquiring thermal image data including a sensor output value related to a thermal image from an infrared sensor for capturing the thermal image;

a statistical data generation step of generating statistical data about pixel values related to the sensor output value from the thermal image data;

a calibration control step of controlling, based on an environmental temperature, calibration for the sensor output value of the thermal image data in a state where a shutter is closed, the shutter blocking light incident on the infrared sensor; and an image data output step of outputting image data related to the thermal image resulting from the calibration, wherein in the calibration control step, in a case where the pixel values included in the statistical data include an upper limit value or a lower limit value, the upper limit value or the lower limit value being set in advance, shift adjustment is performed for the sensor output value based on a shift amount which is set in advance, and the calibration to be performed for an adjustment value resulting from the shift adjustment is controlled.

* * * * *